US010442582B1

(12) United States Patent
     Ekkert

(10) Patent No.: US 10,442,582 B1
(45) Date of Patent: Oct. 15, 2019

(54) SPOUT FITMENT APPARATUS FOR A FLEXIBLE CONTAINER

(71) Applicant: Phoenix Closures, Inc., Naperville, IL (US)

(72) Inventor: Len Ekkert, Lemont, IL (US)

(73) Assignee: PHOENIX CLOSURES, INC., Naperville, IL (US)

( * ) Notice: Subject to any disclaimer, the term of this patent is extended or adjusted under 35 U.S.C. 154(b) by 0 days.

(21) Appl. No.: 16/103,252

(22) Filed: Aug. 14, 2018

(51) Int. Cl.
| | |
|---|---|
| *B65D 47/12* | (2006.01) |
| *B65D 25/42* | (2006.01) |
| *B65D 75/58* | (2006.01) |
| *B29C 65/00* | (2006.01) |
| *B29C 65/08* | (2006.01) |

(52) U.S. Cl.
CPC .......... *B65D 47/123* (2013.01); *B29C 65/08* (2013.01); *B29C 66/30223* (2013.01); *B29C 66/53263* (2013.01); *B65D 25/42* (2013.01); *B65D 75/5883* (2013.01)

(58) Field of Classification Search
CPC .. B65D 47/123; B65D 25/42; B65D 75/5883; B29C 65/08; B29C 66/30223; B29C 66/53263
See application file for complete search history.

(56) References Cited

U.S. PATENT DOCUMENTS

| | | | |
|---|---|---|---|
| 5,873,491 A | * | 2/1999 | Garcia ............... B05B 11/3001 222/95 |
| 6,000,848 A | | 12/1999 | Massioui |
| 6,050,451 A | | 4/2000 | Hess, III et al. |
| 6,164,822 A | | 12/2000 | Beer |
| 6,241,122 B1 | | 6/2001 | Araki et al. |
| 6,273,307 B1 | | 8/2001 | Gross et al. |
| 6,439,429 B1 | | 8/2002 | Gross |
| 6,485,479 B1 | | 11/2002 | Kneirbein |

(Continued)

FOREIGN PATENT DOCUMENTS

| | | |
|---|---|---|
| DE | 102005028068 | 12/2006 |
| WO | 2006032326 | 3/2006 |

OTHER PUBLICATIONS

English translation of claims related to international publication WO2006032326, generated Jan. 2, 2016, EPO Patent Translate (2 pgs.).

(Continued)

*Primary Examiner* — Frederick C Nicolas
(74) *Attorney, Agent, or Firm* — Husch Blackwell LLP

(57) ABSTRACT

A spout fitment has a spout for dispensing liquid into or out of a flexible container, the spout passing through a base portion that is connected to attachment ribs for sealing to the flexible container. The attachment ribs can contain a sharp edge to facilitate improved adhesion of the flexible container to the attachment ribs of the spout fitment. The attachment ribs can also contain a beveled edge that can provide mechanical support to the attachment sites between the spout fitment and the flexible container. Other embodiments can include a base portion having lateral attachment walls containing a series of elevated ridges that provide extended areas of focal contact between the spout fitment and the flexible container. The base portion can include one or more pockets for holding and manipulating the spout fitment while it is attached to the flexible container.

18 Claims, 13 Drawing Sheets

(56) References Cited

U.S. PATENT DOCUMENTS

| | | | |
|---|---|---|---|
| 6,612,466 B1 * | 9/2003 | Malin | B29C 65/18 |
| | | | 222/107 |
| 6,860,406 B2 | 3/2005 | Kobetsky et al. | |
| 7,172,100 B2 | 2/2007 | Mertens | |
| 7,207,153 B1 | 4/2007 | Malin | |
| 7,350,669 B2 | 4/2008 | Rani | |
| 7,762,414 B2 | 7/2010 | Uytterhaeghe et al. | |
| 7,762,430 B2 | 7/2010 | Wild et al. | |
| 7,850,044 B2 | 12/2010 | Hildebrand et al. | |
| 8,292,121 B2 | 10/2012 | Davideit et al. | |
| D683,219 S * | 5/2013 | Schick | D9/435 |
| 8,459,512 B2 | 6/2013 | Arvizu | |
| 8,528,758 B2 | 9/2013 | Morlot et al. | |
| 8,613,548 B2 | 12/2013 | Murray | |
| 8,672,182 B2 | 3/2014 | Bonet Pedrol | |
| 8,777,058 B2 | 7/2014 | Haefele et al. | |
| 9,132,944 B2 | 9/2015 | Schick | |
| 9,221,592 B2 | 12/2015 | Murray | |
| 9,493,284 B2 * | 11/2016 | Tsuruta | B65D 75/5883 |
| 10,124,936 B2 * | 11/2018 | Santarelli | B65D 75/5883 |
| 2006/0201967 A1 | 9/2006 | Romer | |
| 2009/0139993 A1 | 6/2009 | Last | |
| 2009/0255626 A1 | 10/2009 | Murray | |
| 2009/0285510 A1 * | 11/2009 | Huang | B05B 11/0008 |
| | | | 383/80 |
| 2013/0284769 A1 | 10/2013 | Schick | |
| 2015/0048112 A1 | 2/2015 | Skillin et al. | |
| 2015/0284145 A1 | 10/2015 | Arimoto et al. | |

OTHER PUBLICATIONS

English translation of description related to international publication WO2006032326, generated Jan. 2, 2016, EPO Patent Translate (3 pgs.).

English translation of claims related to German publication DE102005028068, generated Jan. 2, 2016, EPO Patent Translate (2 pgs.).

English translation of description related to German publication DE102005028068, generated Jan. 2, 2016, EPO Patent Translate (4 pgs.).

* cited by examiner

SPOUT FITMENT APPARATUS FOR A FLEXIBLE CONTAINER

BACKGROUND OF THE INVENTION

The present invention relates to a spout fitment for transferring liquids into and out of a flexible container.

Flexible and collapsible containers are commonly used for containing and dispensing a variety of foods, beverages, personal care, cleaning, and other similar products. For example, such a spout fitment is typically used in many single-serving pouches of fruit juice.

Fitments are often used to provide a spout for pouring liquids into and out of flexible containers. Such fitments can be attached to flexible containers to provide a smooth transition between the flexible container and the dispensing spout and particularly to prevent leakage, or the transfer of liquid by any route other than the spout. Such a fitment can be molded or made from a polymeric material that can be heat-sealed, sonic-welded, or otherwise attached to the flexible container.

There is a particular need for fitments that attach easily and securely to flexible containers and can withstand stress placed on the flexible container at the places where it attaches to the fitment. Poorly sealed fitments can be subject to leakage where the fitment attaches to the flexible container, or cause the container to fail altogether.

A problem associated with some fitments is incomplete contact between the connecting surfaces of the flexible container and the fitment, which can result in the formation of air pockets or hollow spaces that prevent the complete sealing of a flexible container to a fitment. Some flexible containers are sealed to fitments along series of spaced ribs, where the spaced ribs can have sharp corners that impede the adherence of the flexible container to the length of the ribs.

A related problem is that areas of connection that include large surface areas may receive insufficient amounts of sonic welding, heating, pressure, or other forms of adhesion, resulting in incomplete bonding at the attachment site. Alternatively, attempts to seal smooth areas on a spout fitment to a polymer, or other material used to make a flexible container, may fail where the surface is insufficiently smooth and gives rise to unsealed pockets or areas.

There is a need for an improved spout fitment that ensures the formation of a tight and stable connection between the fitment and the flexible container.

BRIEF SUMMARY OF THE INVENTION

A particular object of the invention relates to a spout fitment for attachment to a flexible container, the spout fitment comprising: i) a spout in communication with a base portion, the spout passing through the base portion; and ii) the base portion having a plurality of attachment ribs extending outward from the spout, each attachment rib having a periphery comprising a sharp edge, and the spout passing through each attachment rib; where the flexible container includes an interior surface and an exterior surface, the interior surface for joining the sharp edge of the attachment rib when the spout fitment is attached to the flexible container.

An additional object of the invention relates to the spout fitment comprising one or more side walls, each side wall extending outward from the spout, and each side wall connecting a pair of neighboring attachment ribs.

Another object of the invention relates to the spout fitment comprising a fin attached to and extending outward from the side wall.

Another object of the invention relates to the spout fitment where a thickness of the attachment rib is uniform.

Another object of the invention relates to the spout fitment where the sharp edge of the attachment rib is located in a periphery of the attachment rib.

Another object of the invention relates to the spout fitment where the sharp edge of the attachment rib comprises a beveled surface.

Another object of the invention relates to the spout fitment where each attachment rib comprises a curved central portion flanked by a pair of tapering end portions, each attachment rib having a double-wedge shape.

A further object of the invention relates to the spout fitment comprising a closure.

Yet a further object of the invention relates to a container comprising the spout fitment.

Another particular object of the invention relates to a spout fitment for attachment to a flexible wall of a container, the spout fitment comprising: i) a spout in communication with a base portion, the spout passing through the base portion; and ii) the base portion including: a) a top wall having a double-wedge shape; b) a bottom wall having a double-wedge shape; and c) a pair of lateral attachment walls connecting the top and bottom walls, at least one lateral wall including one or more elevated ridges; where the spout passes through the top and bottom walls, and the spout passes between the lateral attachment walls; and where the container includes an interior surface and an exterior surface, the interior surface for contacting the elevated ridges when the spout fitment is attached to the container.

An additional object of the invention relates to the spout fitment where the lateral attachment walls define a double-wedge shape.

An additional object of the invention relates to the spout fitment where the lateral attachment walls comprise a plurality of spaced-apart elevated ridges.

Another object of the invention relates to the spout fitment where the elevated ridges define zigzagging pathways.

Another object of the invention relates to the spout fitment where the spout passes through a central portion of the top and bottom walls.

A further object of the invention relates to the spout fitment where the base portion comprises end segments, at least one end segment attached to an outwardly-extending fin.

Another particular object of the invention relates to a spout fitment for attachment to a flexible wall of a container, the spout fitment comprising: i) a spout in communication with a base portion, the spout passing through the base portion; and ii) the base portion including: a) a bottom wall having a double-wedge shape; and b) a pair of lateral attachment walls attached to the bottom wall, the lateral attachment walls joining to define a double-wedge shape with a first end portion and a second end portion, and each lateral wall including one or more elevated ridges on an exterior surface; where the spout passes through the bottom wall, the spout passes between the lateral attachment walls, and each lateral wall contacts an exterior surface of the spout; and where the container includes an interior surface and an exterior surface, the interior surface for contacting the elevated ridges when the spout fitment is attached to the container.

An additional object of the invention relates to the spout fitment where each end of the base portion includes at least one pocket in communication with the spout, the pocket defined by a juncture of the spout, the bottom wall, and the lateral attachment walls.

Another object of the invention relates to the spout fitment, he base portion having a central portion positioned between tapering end portions, the tapering end portions defining a portion of the pocket.

A further object of the invention relates to the spout fitment, where at least one lateral attachment wall comprises a plurality of non-intersecting elevated ridges.

Another object of the invention relates to the spout fitment where the elevated ridges define zigzagging pathways.

BRIEF DESCRIPTION OF THE DRAWINGS

FIGS. 4A-4B show side views of a spout fitment having a cap detached and attached, respectively, and FIGS. 4C-4D show bottom perspective views of a spout fitment and cap detached and attached, respectively;

FIGS. 5A-5B show top perspective views of the spout fitment, FIG. 5C shows a side view of the fitment, FIG. 5D shows a top view of the fitment, and FIG. 5E shows a bottom perspective of the fitment;

FIGS. 6A-6B show top perspective views of the spout fitment, FIG. 6C shows a top view of the fitment, and FIG. 6D shows a bottom perspective of the fitment; FIGS. 7A-7C show perspective top views of the spout fitment, and FIGS. 7D-F shows a side, top, and bottom view of the fitment.

DETAILED DESCRIPTION OF PREFERRED EMBODIMENTS OF THE INVENTION

Figure 1:
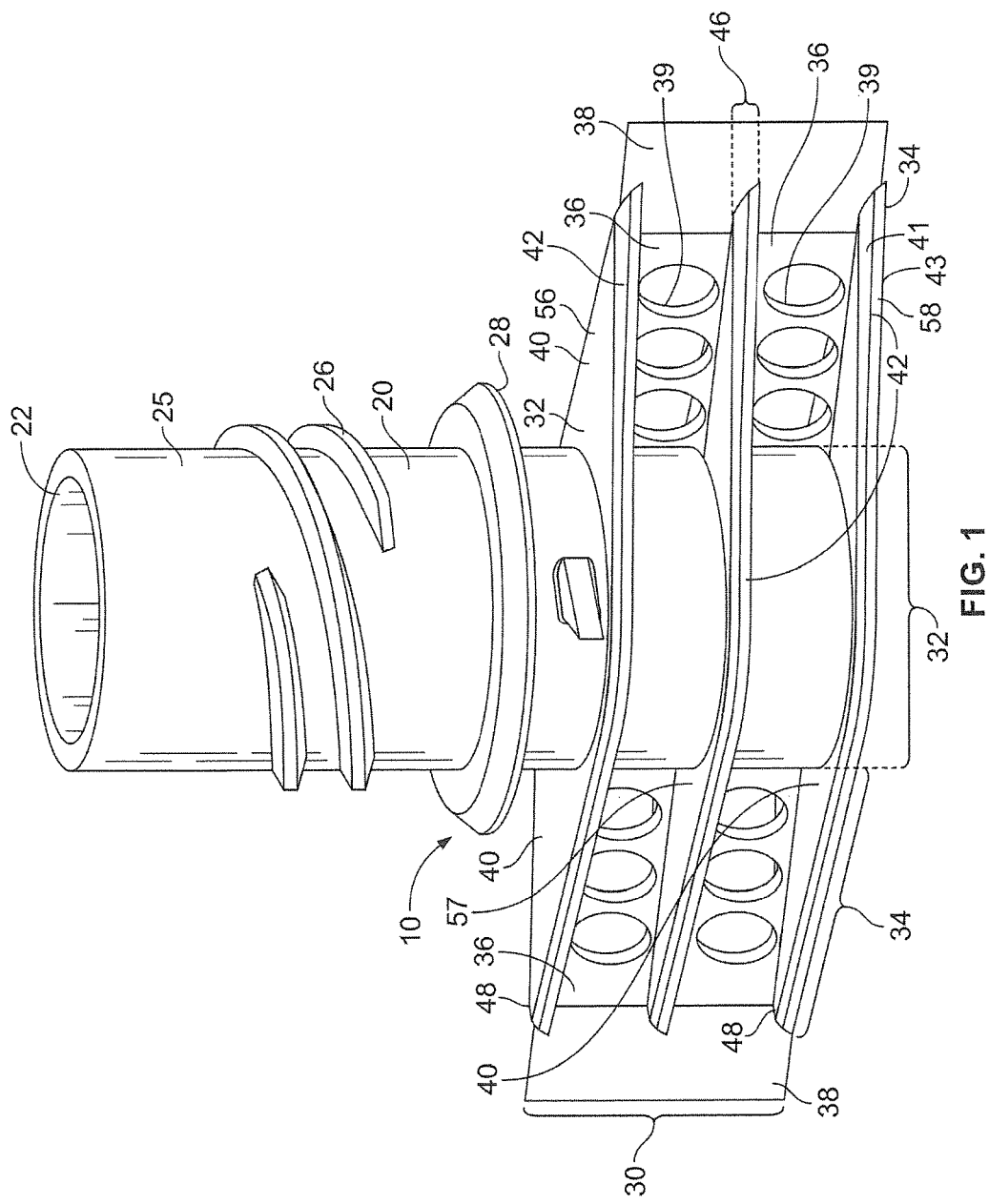
FIG. 1 shows a perspective view of an embodiment of a spout fitment.

The spout fitment provides an apparatus for delivering liquid into or out of a flexible container while maintaining a leakproof seal, where the spout fitment is for being sealed to a container, for example, a collapsible pouch.

While this invention is susceptible of embodiments in many different forms, there are shown in the drawings and will be described in detail herein specific embodiments with the understanding that the present disclosure is to be considered as an exemplification of the principles of the invention. It is not intended to limit the invention to the specific illustrated embodiments.

The features of the invention disclosed herein in the description, drawings, and claims can be significant, both individually and in any desired combinations, for the operation of the invention in its various embodiments. Features from one embodiment can be used in other embodiments of the invention.

It should be further understood that the title of this section of this specification, namely, "Detailed Description Of The Invention," relates to a requirement of the United States Patent & Trademark Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

A typical flexible container 92 can be a pouch, sack, or bag, and can be a collapsible vessel. The flexible container 92 can preferably be made from a flexible material, such as a heat-sealable sheet, or contain a flexible lining. The flexible material or lining can be sealed to the spout fitment 10 by ultrasonic bonding, heat sealing, welding, adhesive, pressure, or other methods known in the art. For example, an exemplary container can be made of a sheet of a polymeric material, such as a plastic film, or a bag-type container made of a foil material, such as aluminum foil.

The spout fitment 10 can be manufactured or molded from a material suitable for sealing to a heat-sealable sheet. The spout fitment 10 can be injection molded from a thermoplastic material such as polyethylene or polypropylene, such as high density polyethylene (HDPE).

Embodiment 1: Spout Fitment with Ribs

Figure 2:
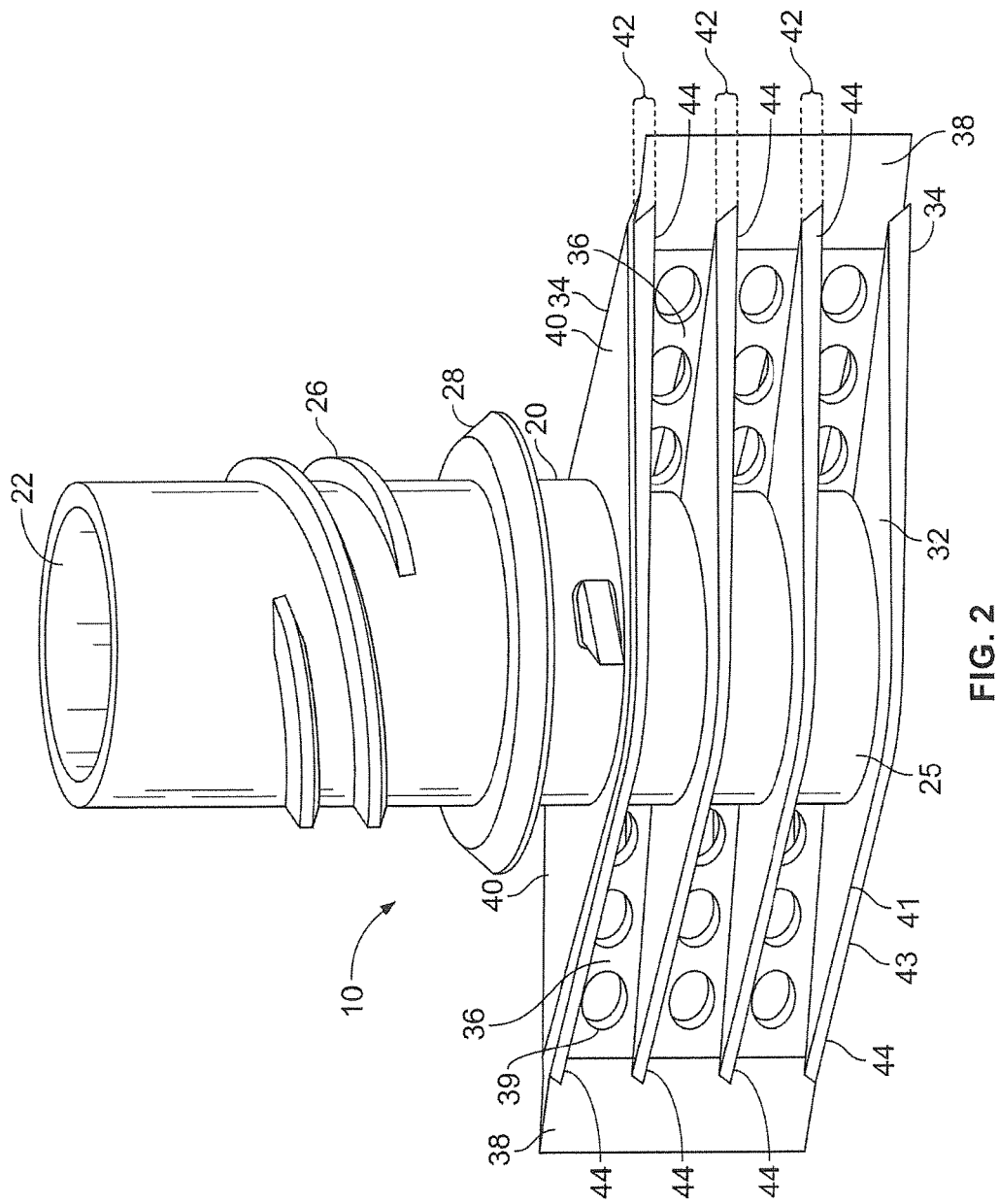
FIG. 2 shows a perspective view of an embodiment of a spout fitment.
Figure 3:
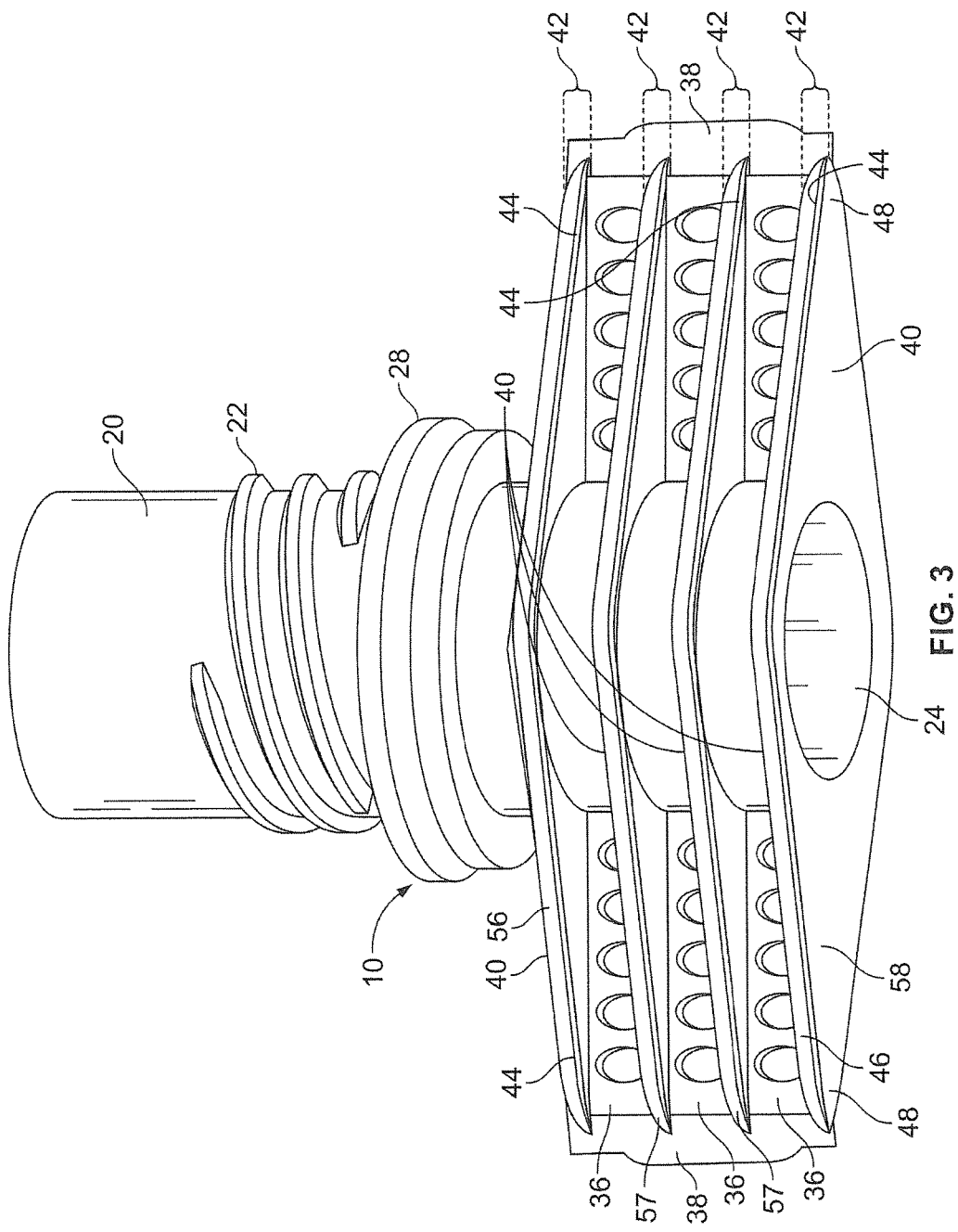
FIG. 3 shows a side view of an embodiment of a spout fitment.

As shown in FIGS. 1-3, some embodiments of the spout fitment 10, meant for attachment to a flexible container 92, have a spout 20 and a base portion 30, the base portion 30 including one or more attachment ribs 40 having end portions 45 extending away from the spout 20. Each attachment rib 40 can include e a generally flat surface, and have a double-wedge (or diamond) shape. Each attachment rib 40 can include a central portion 32, and end portions 45 extending outwardly, preferably in opposite directions when viewed from a top or bottom view, from the central portion 50. The spout 20 can be threaded to pass through the central portion 50 of each attachment rib 40, and the central portion 50 can contact a portion of the exterior surface 25 of the spout 20. Here, the central portion 50 can be hollow or define an or orifice or include a perforation through which the spout 20 can pass. It is preferred that the spout 20 define an unobstructed passageway between an interior portion 94 of flexible container 92, for dispensing a pourable material into or out of the flexible container 92. It is also preferred that the engagement between the exterior surface 25 of the spout 20 and the base portion 30 provide a continuous seal or connection around the spout 20, so that the water (or even air) cannot pass through the seal or connection.

Each attachment rib 40 can have first and second end portions 45 set at opposite ends of the attachment rib 40; preferably, the tips of the end portions 45 define a length that is greater than a diameter of the spout 20. Each attachment rib 40 can include an upper surface 52 (facing away from the flexible container 92 when the spout fitment 10 is attached to the flexible container 92) and a lower surface 54 on the side opposite the upper surface 52 (facing toward the flexible container 92 when the spout fitment 10 is attached to the flexible container 92).

Each attachment rib 40 can have a peripheral edge or periphery 42 including a sharp edge 44, the juncture where the upper and lower surfaces 52, 54 meet and define the periphery 42.

The attachment ribs 40 can extend transversally from a longitudinal axis of the spout 20. Preferably, the attachment ribs 40 define a plane that is substantially perpendicular to the longitudinal axis of the spout 20. When viewed from a top or bottom perspective, the attachment ribs 40 can be positioned to lie on the same line.

Where there is a series of attachment ribs 40, they can be arranged around the spout 20 so that the attachment ribs 40 are spaced apart from each other, preferably spaced apart at equal distances. The attachment ribs 40 can be uniformly spaced apart from each other or can be irregularly spaced. The attachment ribs 40 can be arranged to parallel each other; that is, a longitudinal axis defined by the end portions 45 of each attachment rib 40 can be arranged parallel to each other. These stacked attachment ribs 40 can define the base portion 30 of the spout fitment 10. The attachment ribs 40 can be arranged alongside each other, and each attachment rib 40 can have a tapered point 48 for contacting a flexible wall of a container 92.

The tapered points 48 are located where an attachment rib 40 tapers or narrows to a point in cross-section. The tapered point 48 can describe a vertex of an angle in cross-section; preferably, an angle of 0-90°. More preferred is an acute angle of 30-60°, and even more preferred is an acute angle of 40-50°. In some embodiments, the tapered point 48 can include one or more curved surfaces in its profile. For example, the profile or cross-section of a tapered point 48 can be shaped like a claw, a quarter circle, or a quarter of an ellipse defined by the intersection of the major axis and minor axis of an ellipse.

The tapered point 48 is configured for connecting to the flexible wall of a container 92. When the spout fitment 10 is connected to the container 92 by, for example, compression, adhesion, heat-sealing, or other typical means of attaching the spout fitment 10 to the container 92, the tapered point 48 must contact the flexible wall when attached, heat-sealed, or adhered to the associated container.

The tapered point 48 connects the spout fitment 10 to the flexible wall of the container 92. It is meant to restrict the movement of liquids or other flowable substances into and out of the container 92 to the ends of the spout 20 and to prevent leakage around the edges of the base portion 30 or attachment ribs 40 of the spout fitment 10. This does not, however, preclude the possibility that the finished container 98 can have other means of moving materials in and out of the finished container 98. For example, an intravenous bag can also comprise tubing that connects the bag to a patient.

Where there is a series of attachment ribs 40, there can be a top attachment rib 56 (the attachment rib 40 furthest from the flexible container 92 when the spout fitment 10 is attached to the flexible container 92) and a bottom attachment rib 58 (the attachment rib 40 closest to the flexible container 92 when the spout fitment 10 is attached to the flexible container 92). There can also be one or more central attachment ribs 57 between the top and bottom attachment ribs 56, 58.

In a more preferred embodiment, the base portion 30 can include side walls 36 that connect the spaced-apart attachment ribs 40. Each side wall 36 can define a generally planar surface that can extend outwardly from the exterior surface 25 of the spout 20, connecting a pair of neighboring attachment ribs 40 to each other, preferably along a longitudinal axis of each attachment rib 40. Each side wall 36 can extend to the tip of an end portion 45, extend past the tip of an end portion 45, or terminate before it reaches the tip of the end portion 45. Each side wall 36 can define a continuous or contiguous planar surface; in some embodiments, each side wall can include a perforation or cutout, or a plurality of perforations or cutouts 39.

The side walls 36 can connect neighboring attachment ribs 40 to each other; alternatively, the side walls 36 can be said to space the neighboring attachment ribs 40 apart. Each side wall 36 can define a plane that is perpendicular to the planes defined by the attachment ribs 40.

A side wall 36 can be located between each the end portions 45 of neighboring attachment ribs 40; it is preferred that a side wall 36 be located between both opposite ends portions 45 of each pair of neighboring ribs. Each pair of neighboring attachment ribs 40 can have one or more side walls 36 joining them.

The side walls 36 can provide a complete or partial connection between the attachment ribs 40. The side walls 36 can be solid or contain cutouts 39 or spaces, which decreases the amount of material required to make the side walls 36.

In some embodiments, the base portion 30 can have side walls 36 that connect the attachment ribs 40. Where a pair of neighboring attachment ribs 40 are joined by a side wall 36 on one end portion 45, it is preferred that another side wall 36 join the same attachment ribs 40 on the other side.

The side walls 36 can extend past the attachment ribs 40. In some embodiments, a projection or fin 38 can extend outward from the outer edge of the side wall 36 (e.g., edge furthest away from the spout 20). These fins 38 can define generally planar surfaces providing narrow flaps extending outward from the end portions 34 of the base portion 30 and/or end portions 45 of the attachment ribs 40. The fins 38 can be oriented along a plane parallel to a longitudinal axis of the spout 20.

These fins 38 can be thinner than the side walls 36. The fins 38 can extend the overall length of the base portion 30 when viewed from a side, bottom, or top perspective. The fins 38 can be flexible.

The base portion 30 can have a double-wedge shape (when viewed from a top or bottom perspective); it can include a central portion 32 (which includes the central portion 50 of each attachment rib 40); and end portions 34 extending outwardly (which can include the end portions 45 of the attachment ribs 40), preferably extending in opposite directions, from the central portion 32, with the side walls 36 associated with the end portions 45 of the base portion 30.

As shown in FIGS. 1-3, the spout fitment 10 has a spout 20 through which liquid or other pourable substance is delivered into and out of the flexible container 92. The spout 20 has an external port 22 at one end; when the spout fitment 10 is attached to a flexible container 92, the external port 22 faces the outside of the flexible container 92. The spout 20 has an internal port 24 at the other end; when the spout fitment 10 is attached to a flexible container 92, the internal port 24 faces the interior 94 of the flexible container 92. If the flexible container 92 is made of an opaque material, the internal port 24 is not visible when the spout fitment 10 is sealed to the flexible container 92.

The base portion 30 of the spout fitment 10 can communicate or associate with the internal port 24. The base portion 30 can have a roughly double-wedge shape with i) a central portion 32 that girdles the spout 20 and ii) end portions 34 that extend outward in opposite directions. The base portion 30 can have extensions that extend transversally from a longitudinal axis of the spout 20 that are referred to as attachment ribs 40; the base portion 30 can include fins 38 attached to the attachment ribs 40 that extend past the attachment ribs 40 and accentuate a tapering profile when viewed from above or below. The flexible container 92 can be sealingly attached to the spout fitment 10 at the attachment ribs 40. When the container is sealed to the spout fitment 10, a portion of the interior surface 94 of the flexible container 92 is sealed to the attachment ribs 40. If the flexible container 92 is made of an opaque material, the base portion 30 can be hidden from view when the spout fitment 10 is sealed to the flexible container 92.

The spout fitment 10 can have a collar 28, an outwardly extending structure protruding from the outer surface 25 of the spout 20, or a depression or groove or furrow (not shown) that separates the upper end of the spout 20, which includes the external port 22, from the base portion 30, which contains the internal port 24

The attachment ribs 40 can extend to a lesser distance than the side walls 36 or the same distance, or extend past the side walls 36. In embodiments including fins 38, the attachment ribs 40 can also extend further, such as to the inner or outer edges of the fins 38, or even further past the fins 38.

The thickness of the attachment ribs 40 can be uniform or can vary. For example, when viewed from a side perspective, the attachment ribs 40 can have greater thickness in their central portion 50, compared to their thickness at their end portions 45, or vice versa.

The peripheries 42 of the attachment ribs 40 can have sharp edges 44. The sharpened outer edges 44 can provide a secure attachment when the flexible container 92 is sealed to the attachment ribs 40. It is believed that the smaller surface area of the sharpened, outwardly-pointing edges 44 facilitate a stronger connection to the flexible container 92, compared to ribs of similar thickness with smooth peripheries 42.

The sharp outer edge or edges 44 of an attachment ribs 40 can be positioned so that the sharp edge 44 is located in the center of the periphery 42 of the attachment rib 40, in an equatorial fashion. In some embodiments, the sharp edge 44 can be placed on the portion of the periphery 42 closest to the internal port 24 of the spout 20, the top edge 41 of the periphery 42. Alternatively, the sharp edge 44 can be placed on the portion of the periphery 42 closest to the external port 22 of the spout 20, or the bottom edge 43 of the periphery 42. Alternatively, part or all of the periphery 42 of the attachment ribs 40 can be beveled or angled or curved, so that the sharp edge 44 is located at the top edge 41 or bottom edge 43 of the periphery 42 of the attachment ribs 40. In a particularly preferred embodiment, the periphery 42 of the attachment ribs 40 can be smoothed or shaped so that it has a beveled surface 46 that can provide mechanical support to an attached container.

In some embodiments the sharp edge 44 can be present on the entire periphery 42 of the attachment ribs 40. In some embodiments, the sharp edge 44 can be present on only part of the attachment ribs 40; for example, the sharp edge 44 can be absent from the central portion 32 of the attachment ribs 40 and present only the end portions 45 of the attachment ribs 40. In some embodiments, the sharp edge 44 can be present along the entire periphery 42 of the attachment ribs 40, but in other embodiments, the sharp edge 44 can be interrupted in discrete or regular locations along the periphery 42. For example, in some embodiments, the periphery 42 of the central portion 32 of the base portion 30 is smooth and lacks a sharp edge 44, while the periphery 42 of the attachment ribs 40 attached to the end portions 45 of the base portion 30 comprises the sharp edge 44. In some embodiments, the sharp edge 44 further comprises a beveled surface 46.

The sharp edge 44 can be configured for joining or connecting to a flexible container 92 or the flexible wall, usually the inner surface, of a container 92. When the spout fitment 10 is connected to the flexible container 92, it provides a connection that prevents the passage of liquid or other flowable substance between the sharp edge 44 and the flexible container 92. In some embodiments, that connection can be watertight; in some embodiments, that connection can be airtight.

Embodiment 2: Spout Fitment with Lateral Attachment Walls

As shown in FIGS. 5-6, some embodiments of the spout fitment 10, meant for attachment to a flexible container 92, have a spout 20 and a base portion 30, the base portion 30 for communicating with an interior surface 94 of the flexible container 92. The spout 20 can define a passageway travelling through the base portion 30.

The base portion 30 can include a top wall 62, bottom wall 64, and lateral attachment walls 66 extending between the top and bottom walls 62, 64. The top and bottom walls 62, 64 can each have a central portion 68, 69 that is hollow or defines an orifice that the spout 20 can be inserted through. It is preferred that the central portions 68, 69 have a diameter or length that is greater than a diameter or length of the spout 20, and that the central portions 68, 69 surround or encircle a portion of the exterior surface 25 of the spout 20. It is preferred that the base portion 30 joins or engages the spout 20 so as to prevent the flow of a liquid (or even air) between the spout 20 and the base portion 30.

The top and bottom walls 62, 64 can have a double-wedge or diamond shape, when viewed from a top or bottom perspective, with the spout 20 traversing through the central portions 68, 69 of the top and bottom walls 62, 64. The top wall 62 (the wall furthest from the flexible container 92 when the spout fitment 10 is attached to the flexible container 92) and the bottom wall 64 (the wall closest to the flexible container 92 when the spout fitment 10 is attached to the flexible container 92) can have end portions 81, 82 that extend in preferably opposite directions. The end portions 81, 82 can have a broader width at the central portion 68, 69 that tapers into sharp or blunt tips.

The spout 20 can travel between the lateral attachment walls 66 and through the top and bottom walls 62, 64. The spout 20 can have an internal port 24 for facing the interior portion 94 of the flexible container 92 and an external port 22 for dispensing a flowable material from the flexible container 92. Preferably, a longitudinal axis of the spout 20 is oriented parallel to the lateral attachment walls 66 and/or perpendicular to the top and/or bottom walls 62, 64.

As shown in FIGS. 5A-5B, 5D-5E, and 6A-6D, a central portion 67 of each lateral attachment wall 66 can follow the curvature or outline of the outer surface 25 of the spout 20. The central portion 67 can expend outward, away from the center into end segments 75 flanking either side of the central portion 67, with the end segments 75 of one lateral attachment wall 66 meeting or joining the end segments 75 of another lateral attachment wall 66.

On its exterior surface 76, each lateral attachment wall 66 can include a solid or continuous or contiguous surface for communicating with the flexible container 92. Each lateral attachment wall 66 can include one or more elevated ridges 72, or raised lines, on its exterior surface 76, for communicating with the flexible container 92. Alternatively, one or more grooves or furrows 74 can be etched or otherwise introduced onto the exterior surface 76 of the lateral attachment wall 66. It is preferred that each elevated ridge 72 define a raised or elevated line or pathway on the exterior surface 76. The surface area presented by each elevated ridge 72 can be increased by generating an elevated ridge 72 defining a zigzagging pathway. As shown in FIGS. 5A-5C and 6A-6B, each elevated ridge 72 (or depressed groove 74) can follow a path having a zigzag or herringbone pattern; that is, it can define a nonlinear path containing many transverse angles. Preferably, the neighboring segments of such nonlinear paths form angles of the same size.

Where there is more than one elevated ridge 72, it is preferred that they follow parallel pathways. The elevated ridges 72 can define pathways that are spaced apart, that do not intersect.

Each elevated ridge 72 or depressed groove 74 can span from one end of a lateral attachment wall 66 to the other end of the lateral attachment wall 66, or can span from one end portion 70 of the base portion 30 to the other end portion 70 of the base portion 30. It is preferred that each elevated ridge 72 defines a continuous or contiguous pathway along the outer surface 76 of the lateral attachment wall 66, to provide a continuous area of attachment or sealing between the spout fitment 10 and the flexible container 92 along one side of the base portion 30.

Whether the base portion 30 contains elevated ridges 72 or depressed grooves 74, their effect is to create a lateral attachment wall 66 with a highly contoured exterior surface 76 that can present multiple focal points or focal areas for attaching the flexible container 92 to the spout fitment 10. That is, when a portion of the interior surface 94 of the flexible container 92 is pressed against or otherwise sealed to the base portion 30 of the spout fitment 10, focused pressure or force can be applied at the sites where the elevated ridges 72 contact the interior surface 94 of the flexible container 92, thereby facilitating a connection or seal between the fitment 10 and container 92.

Where each lateral attachment wall 66 contains a series of parallel elevated ridges 72, those ridges 72 can provide multiple focal sites of attachment. It is expected that the parallel arrangement of the elevated ridges 72 generates parallel regions of attachment (e.g., sealing attachment) between the spout fitment 10 and the flexible container 92 that result in a stronger seal or attachment between them 10, 92. A plurality of elevated ridges 72 (or depressed grooves 74) can provide a highly contoured or textured exterior surface 76 that can present multiple focal points or focal areas for attaching the flexible container 92 to the spout fitment 10.

In some embodiments, fins 38 can extend outward from the end of each lateral attachment wall 66, effectively extending the overall length of the base portion 30 when viewed from a side perspective. The fins 38 can define generally planar structures that accentuate the tapering of the end portions 81, 82 of the top and bottom walls 62, 64.

Embodiment 3: Spout Fitment with Handling Pockets

As shown in FIGS. 7A-7F, some embodiments of the spout fitment 10, meant for attachment to a flexible container 92, have a spout 20 and a base portion 30, the base portion 30 for communicating with an interior surface 94 of the flexible container 92. The spout 20 can define a passageway travelling through the base portion 30. Generally, these embodiments share some similarities with the embodiments illustrated in FIGS. 5-6, but are different because the base portions 30 of these embodiments: i) lack a top wall 62 attached to the lateral attachment walls 66 and ii) include one or more pockets or receptacles 80 which can be used to position or move the spout fitment 10.

The base portion 30 can include a bottom wall 64 defining a flat surface having a double-wedge shape or diamond shape that surrounds the spout 20. The bottom wall 64 can be solid or have a continuous surface, except for the portion through which the spout 20 passes. It is preferred that the connection between the spout 20 and the bottom wall 64 be a sealing engagement, so that liquids or gases cannot travel between the junction of the spout 20 and bottom wall 64.

A pair of lateral attachment walls 66 can attach to the bottom wall 64 (e.g., to the upper surface 78 of the bottom wall 64), with a central portion 67 of each lateral attachment wall 66 contacting a portion of the outer surface 25 of the spout 20. Each central portion 67 can be flanked on either side by an end segment 69, and each end segment 69 of a first lateral attachment wall 66 can join the end segment 69 of a second lateral attachment wall 66. The joined end segments 69 can provide the base portion 30 with tapered or pointed ends 71, or ends that are blunt or rounded or having another shape. Tapering or pointed ends 71 can be joined or connected to fins 38 that extend outward away from the spout 20, and that increase the overall length of the base portion 30 when viewed from a side perspective.

Thus, the base portion 30 can be provided with a double-wedge or diamond shape when viewed from a top or bottom perspective. In other embodiments, the lateral attachment walls 66 can include curvature or be contoured to echo or mirror the shape of the spout 20 at the locations where the spout 20 and lateral attachment walls 66 contact each other.

The lateral attachment walls 66 can have one or more elevated ridges 72 or depressed grooves 74, for providing a lateral attachment wall 66 with a highly contoured exterior surface 76 that can present multiple focal points or focal areas for attaching the flexible container 92 to the spout fitment 10.

The base portion 30 can include one or more pockets 80 defined by the bottom wall 64, portions of the joined end segments 69, and a portion of the exterior surface 25 of the spout 20. The bottom wall 64 can form the bottom surface of the pocket 80. One side of the pocket can be defined by a portion of the exterior surface 25 of the spout 20, where the spout 20 joins or passes through the bottom wall 64. Other sides of the pocket can be defined by the lateral attachment walls 66 where they join the bottom wall 64. In particular, where the end segment 75 of one lateral attachment wall 66 joins the end segment 75 of another lateral attachment wall 66, that junction (which can define a tapering or pointed end 71) can define two of the walls (or lateral surfaces) of a pocket 80. That is, the pocket 80 can be defined by the junctures or meeting places of the spout 20, bottom wall 64, and end segments 75 of the lateral attachment walls 66.

As shown in FIGS. 7A-7C and 7E, a spout fitment 10 can have a pair of pockets 80 flanking the spout 20; though other embodiments can comprise a single pocket 80 or multiple pockets 80. These pockets 80 can provide an opening or a receptacle facing away from the flexible container 92 when the spout fitment 10 and flexible container 92 are joined together.

Figure 7A:
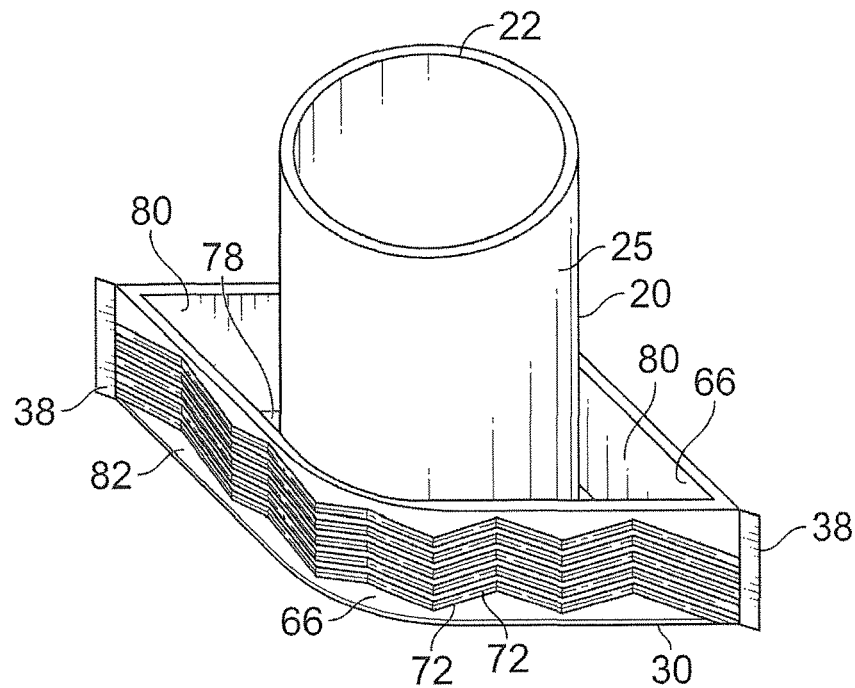
FIGS. 7A-7F show views of an embodiment of a spout fitment.
Figure 7B:
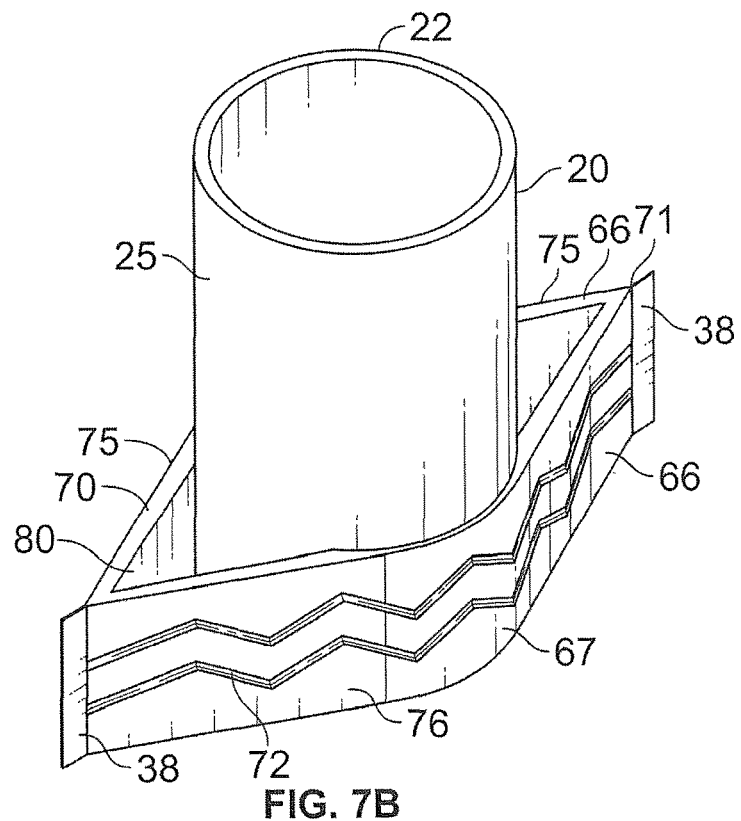
Figure 7C:
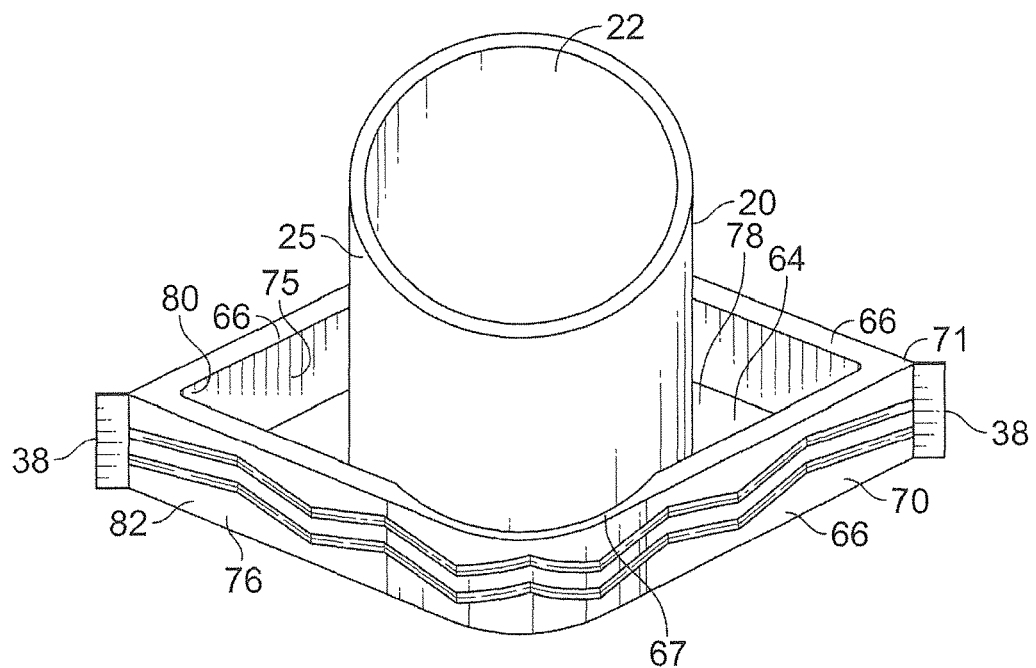
Figure 7D:
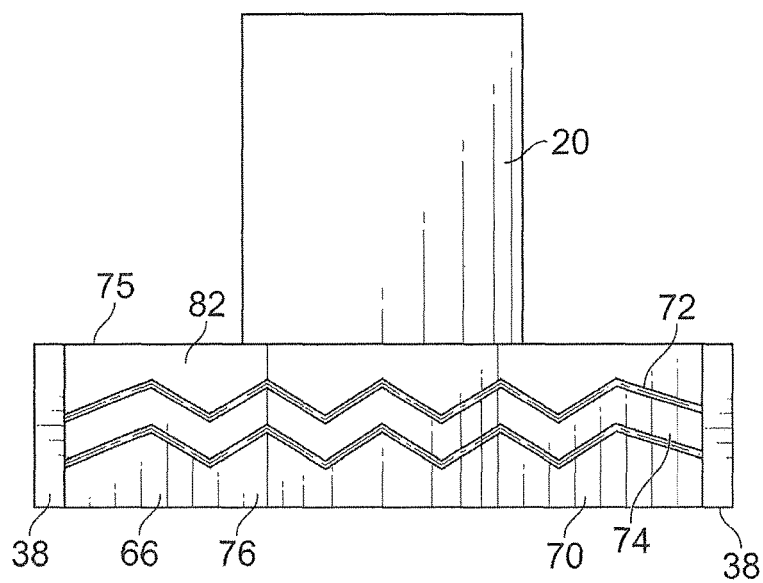
Figure 7E:
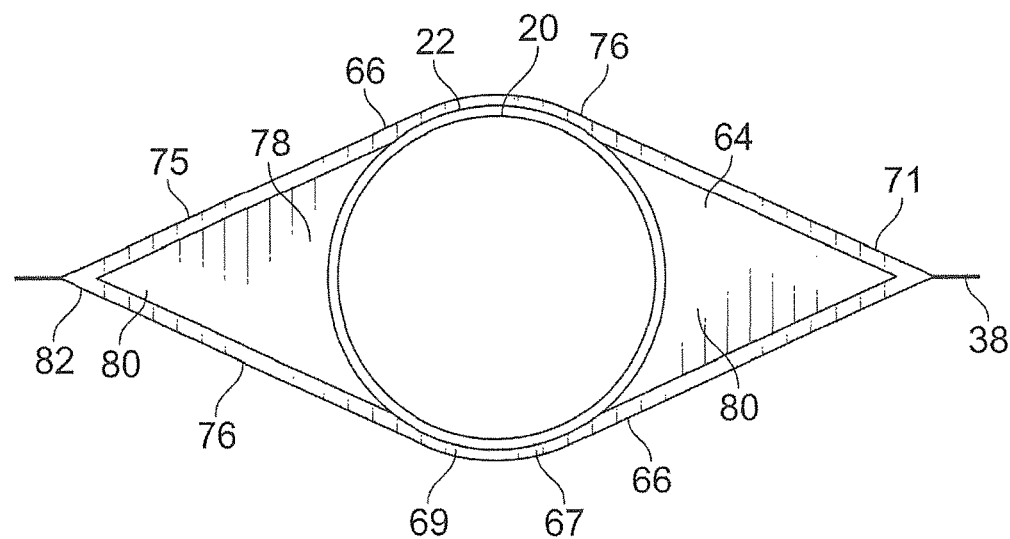
Figure 7F:
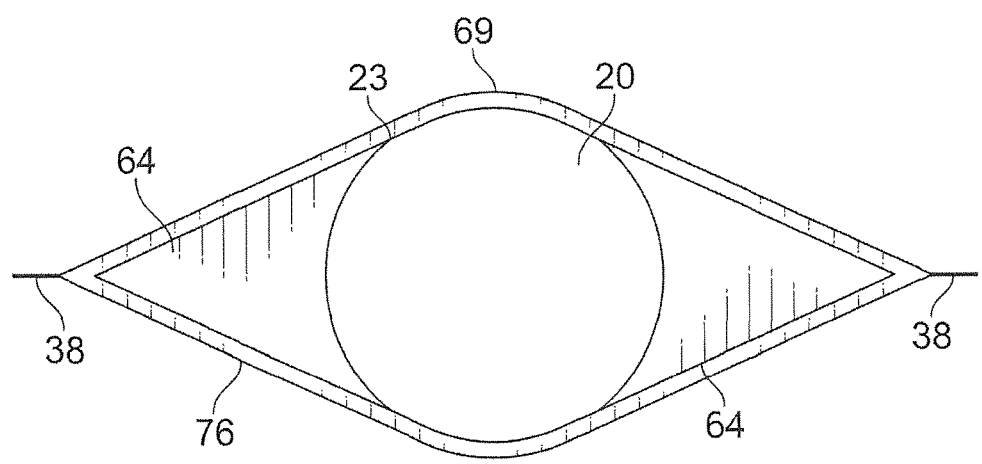

As shown in FIG. 7C, each spout fitment 10 can include a pocket 80 on each end portion 70 of the base portion 30, each pocket 80 flanking and communicating with the spout 20.

It is envisioned that these pockets 80 can aid in the process of attaching the spout fitment 10 to a flexible container 92. The handling pockets 80 can act as receptacles for grasping and handling by devices that can hold or manipulate the spout fitment 10. This feature can be particularly advantageous where the spout 20 is fragile or short or otherwise unsuitable for manipulation during the process of attaching the spout fitment 10 to the flexible container 92. In some embodiments, the pockets 80 can be shaped or contoured to accommodate engagement with fingers or with particular devices used to manipulate spout fitments 10.

Alternate Embodiments of the Spout Fitment

Some embodiments of the spout fitment 10, meant for attachment to a flexible container 92, have a spout 20 connected to a structure or base portion 30. The base portion 30 can have one or more lateral attachment surfaces 66 or attachment ribs 40 extending from the base portion 30, that can project generally outward and away from a longitudinal axis of the spout 20. The container 92 itself can be flexible or inflexible. It is envisioned that the such a flexible wall can be a flexible material that lines the container 92, such as a plastic film or aluminum foil.

Figure 4A:
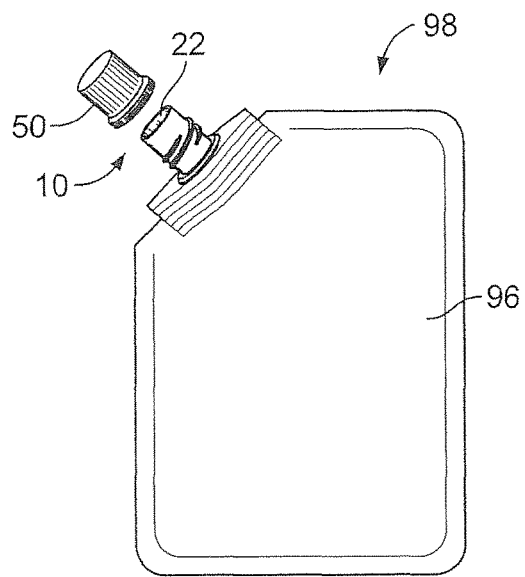
FIGS. 4A-4D show containers comprising a spout fitment and spout fitments with associated closures.
Figure 4B:
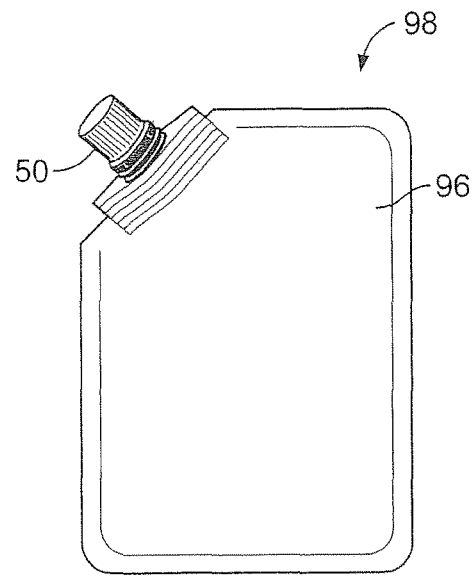
Figure 4C:
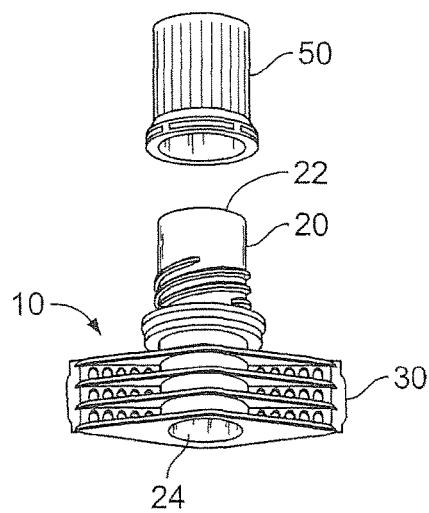
Figure 4D:
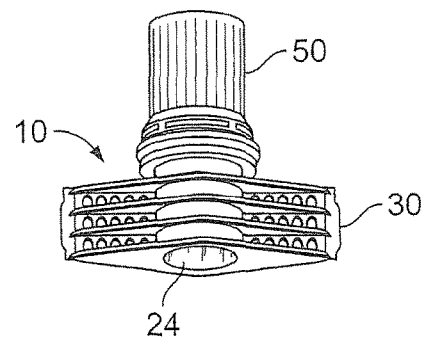
Figure 5A:
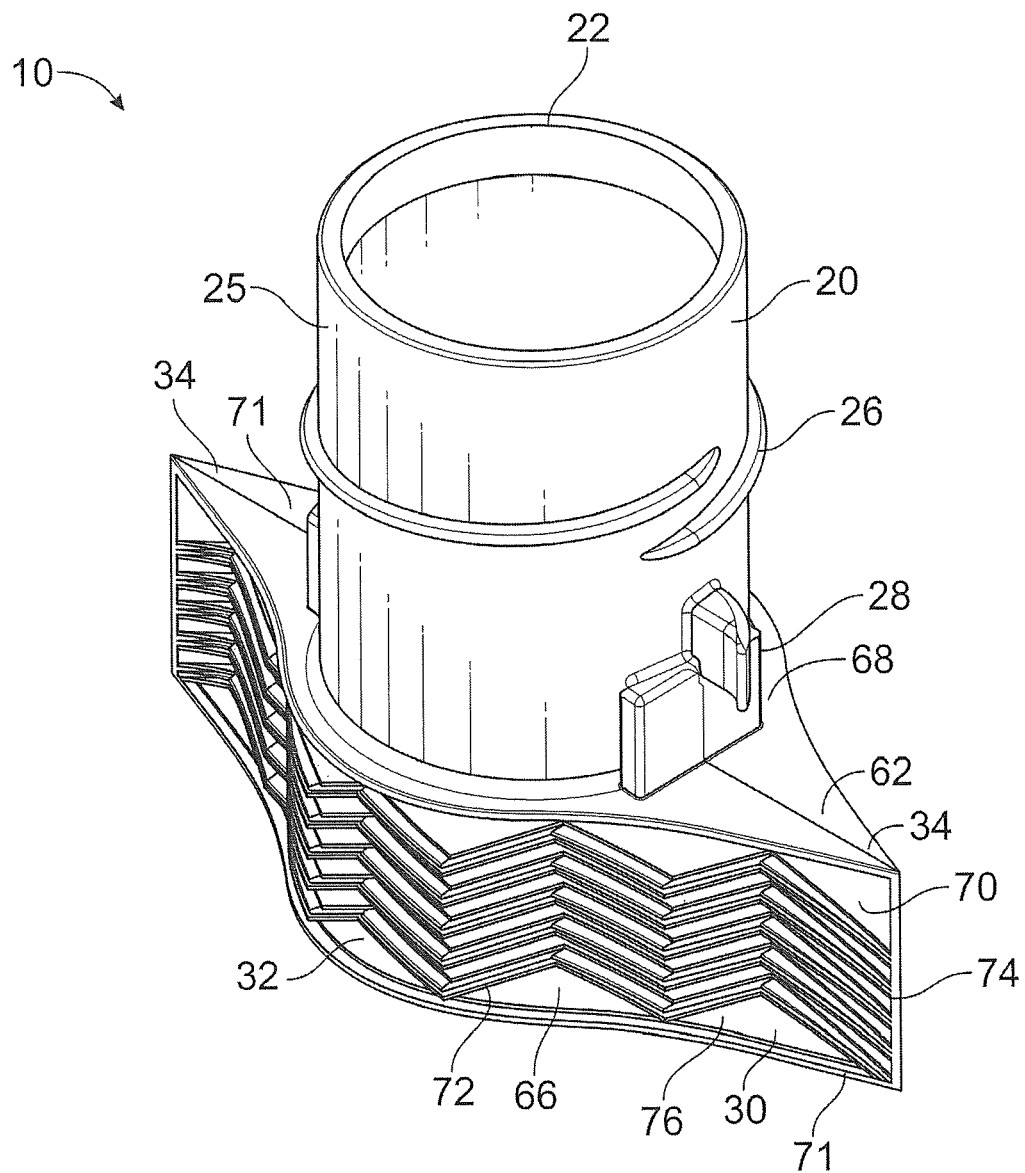
FIGS. 5A-5E show views of an embodiment of a spout fitment.
Figure 5B:
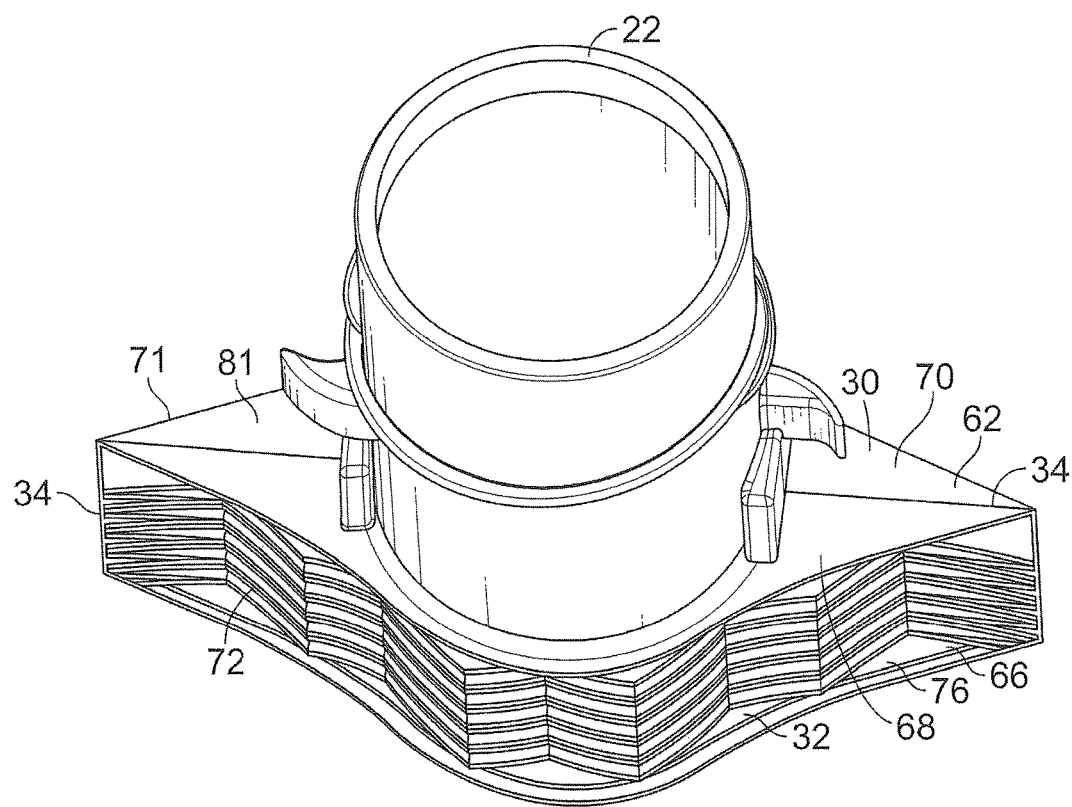
Figure 5C:
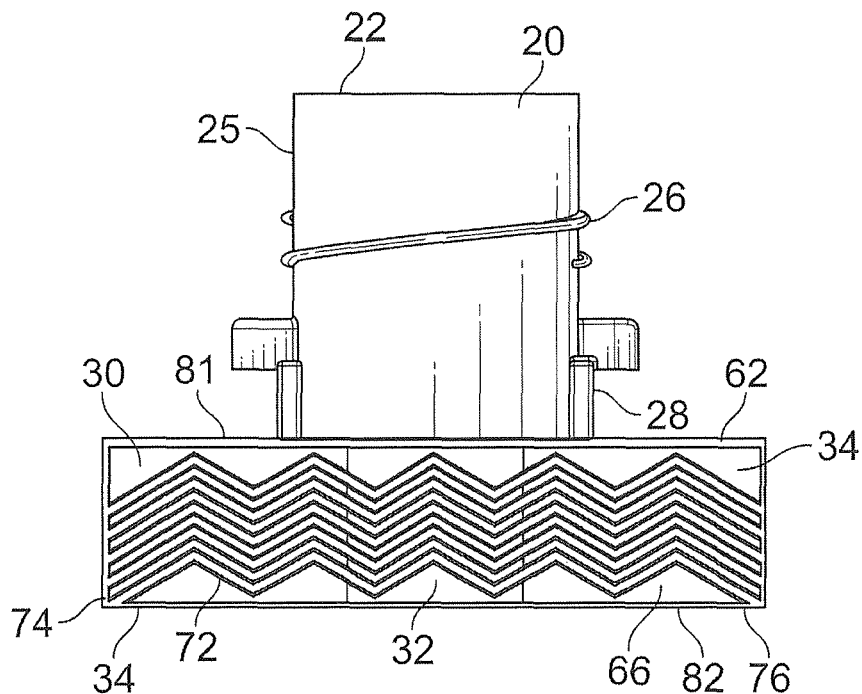
Figure 5D:
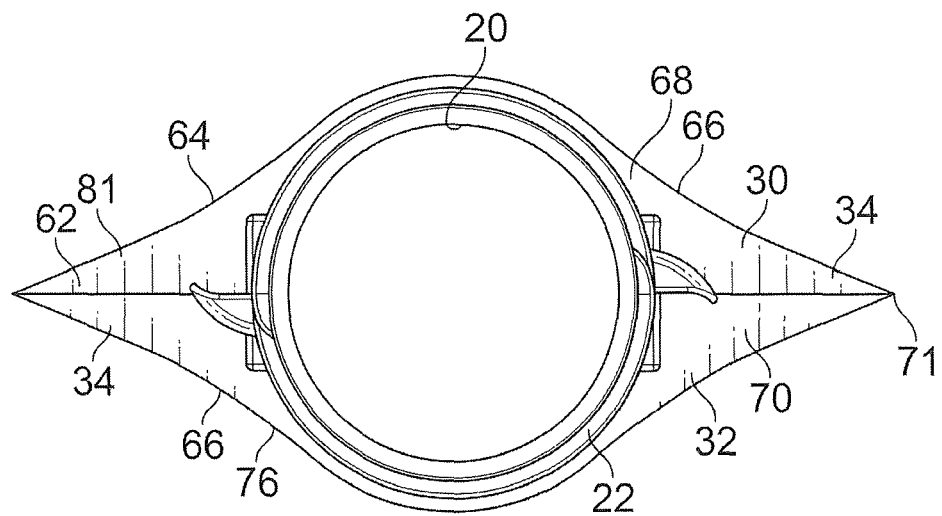
Figure 5E:
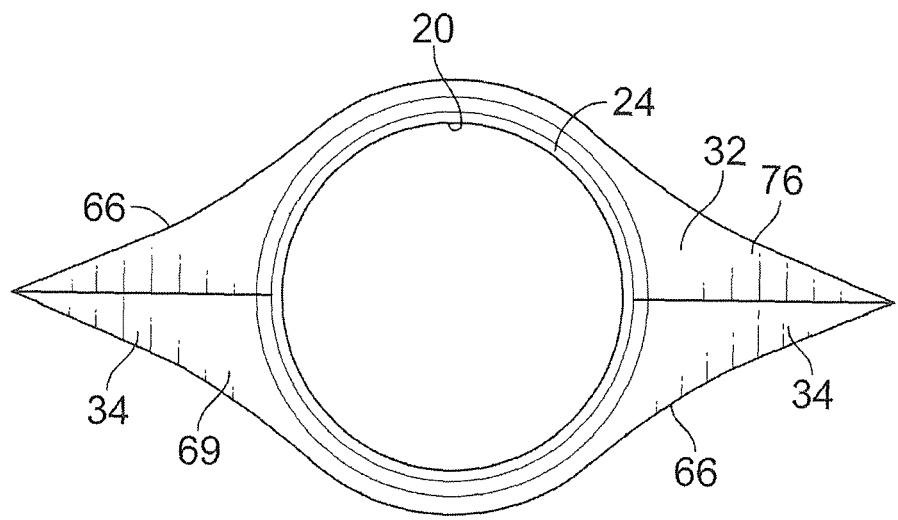
Figure 6A:
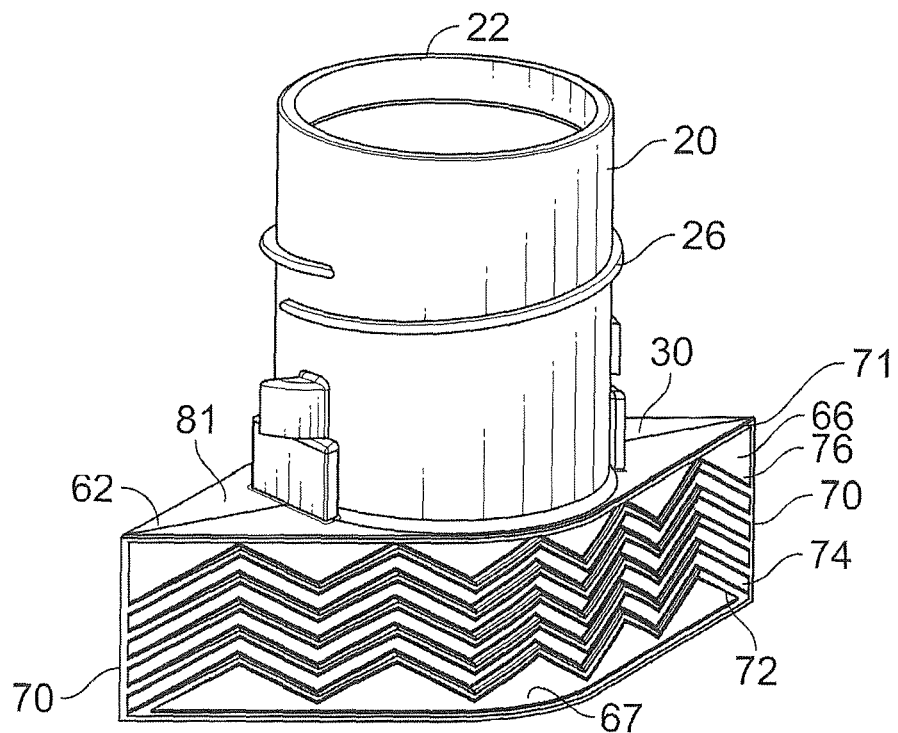
FIGS. 6A-6D show views of an embodiment of a spout fitment.
Figure 6B:
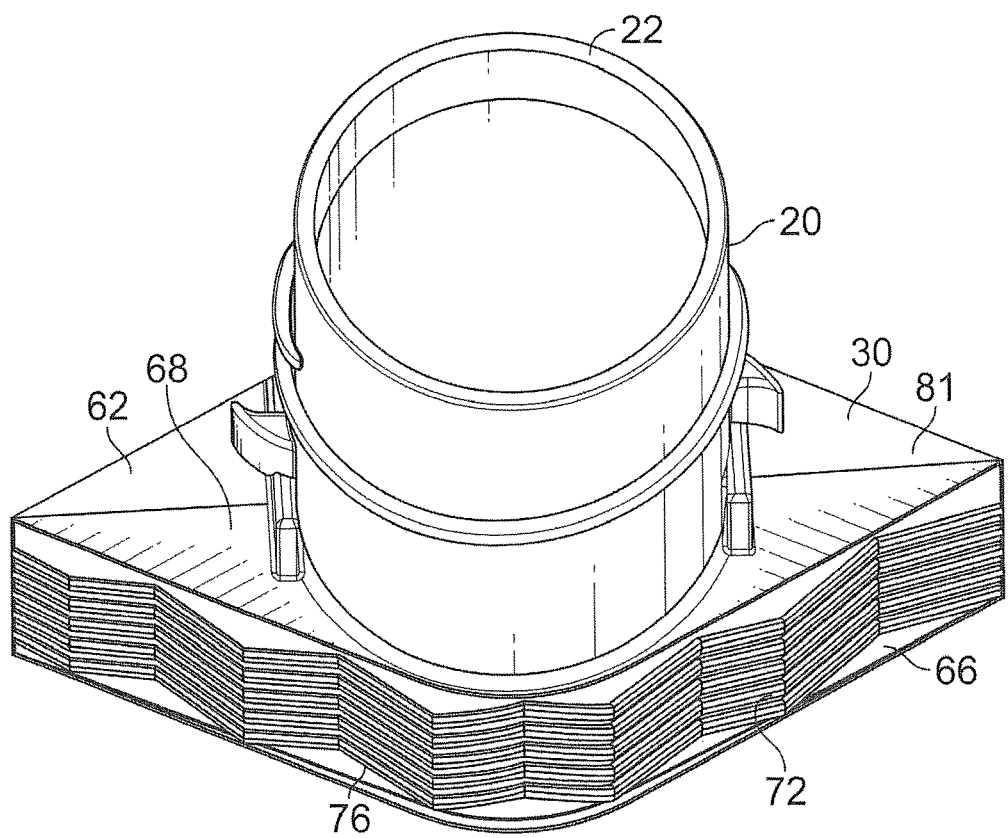
Figure 6C:
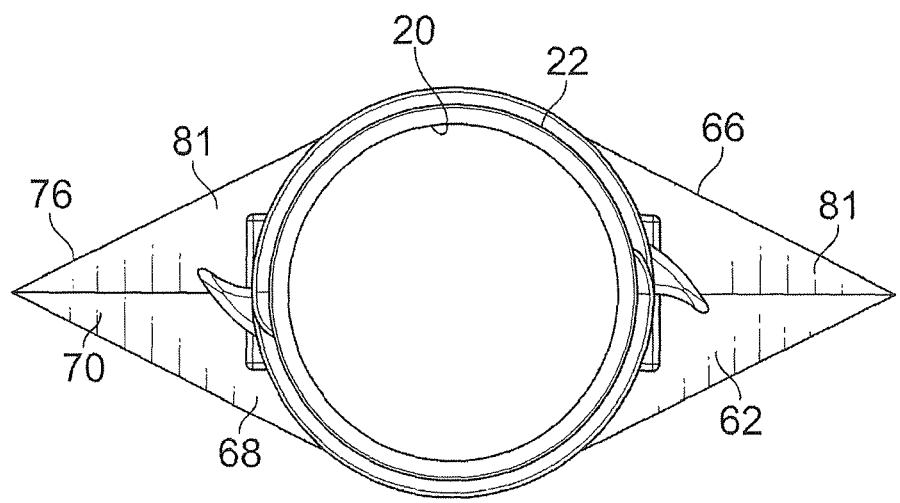
Figure 6D:
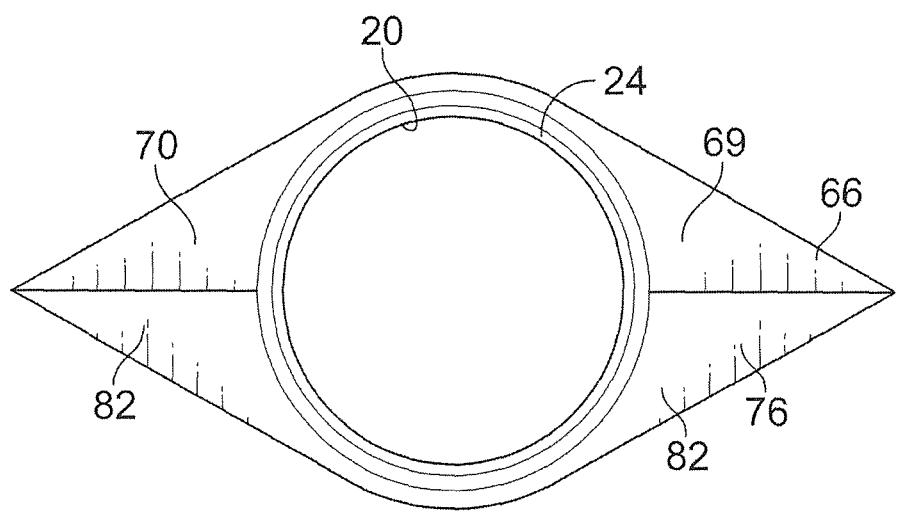

The spout fitment 10 can engage an associated cap or closure 88, as shown in FIGS. 4A-4D. For example, the spout fitment 10 can contain threads 26 for engaging an associated cap or closure 88. The threads 26 can be external or internal threads for engaging corresponding threads on the associated cap or closure 88. In some embodiments, the closure 88 can attach by a snap-on assembly, which can be attached to the spout fitment 10, or other means known in the art. In turn, such as shown by FIGS. 4A-4B, the spout fitment 10 (either with or without the associated closure 88) can be attached or sealed to a flexible container 92 to make a finished flexible container 98 with a spout 20 for dispensing liquids or other pourable material. In some embodiments, a container 92 with a flexible wall, or other flexible container 92 can contain more than one spout fitment 10. For example, a container 92 might have a first spout fitment 10 with a large spout 20 to enable fast loading of the container 92, plus a second, smaller spout fitment 10 with a spout 20 of a size suitable to dispense a volume of liquid suitable for drinking.

Specific embodiments of a dispensing system according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. It is understood to encompass the present invention and any and all modifications, variations, or equivalents that fall within the spirit and scope of the basic underlying principles disclosed and claimed herein.

What is claimed is:

1. A spout fitment for attachment to a flexible container, the spout fitment comprising:
   a spout in communication with a base portion, the spout passing through the base portion;
   the base portion having a plurality of attachment ribs extending outward from the spout, each attachment rib having a periphery comprising a sharp edge, and the spout passing through each attachment rib; and
   one or more side walls, each side wall extending outward from the spout, and each side wall connecting a pair of neighboring attachment ribs;
   wherein the flexible container includes an interior surface and an exterior surface, the interior surface for joining the sharp edges of the attachment rib when the spout fitment is attached to the flexible container; and
   wherein the sharp edge of the attachment rib comprises a beveled surface.

2. The spout fitment of claim 1, comprising a fin attached to and extending outward from the side wall.

3. The spout fitment of claim 1, wherein a thickness of the attachment rib is uniform.

4. The spout fitment of claim 1, wherein the sharp edge of the attachment rib is located in a periphery of the attachment rib.

5. The spout fitment of claim 1, wherein each attachment rib comprises a curved central portion flanked by a pair of tapering end portions, each attachment rib having a double-wedge shape.

6. The spout fitment of claim 1, comprising a closure.

7. The container comprising the spout fitment of claim 1.

8. A spout fitment for attachment to a flexible wall of a container, the spout fitment comprising:
   a spout in communication with a base portion, the spout passing through the base portion; and
   the base portion including:
      a top wall having a double-wedge shape;
      a bottom wall having a double-wedge shape; and
      a pair of lateral attachment walls connecting the top and bottom walls, at least one lateral wall including one or more elevated ridges;
   wherein the spout passes through the top and bottom walls, and the spout passes between the lateral attachment walls; and
   wherein the flexible container includes an interior surface and an exterior surface, the interior surface for contacting the elevated ridges when the spout fitment is attached to the flexible container.

9. The spout fitment of claim 8, wherein the lateral attachment walls define a double-wedge shape.

10. The spout fitment of claim 8, wherein the lateral attachment walls comprise a plurality of spaced-apart elevated ridges.

11. The spout fitment of claim 10, wherein the elevated ridges define zigzagging pathways.

12. The spout fitment of claim 8, wherein the spout passes through a central portion of the top and bottom walls.

13. The spout fitment of claim 8, wherein the base portion comprises end segments, at least one end segment attached to an outwardly-extending fin.

14. A spout fitment for attachment to a flexible wall of a container, the spout fitment comprising:
   a spout in communication with a base portion, the spout passing through the base portion; and
   the base portion including:
      a bottom wall having a double-wedge shape; and
      a pair of lateral attachment walls attached to the bottom wall, the lateral attachment walls joining to define a double-wedge shape with a first end portion and a second end portion, and each lateral wall including one or more elevated ridges on an exterior surface;
   wherein the spout passes through the bottom wall, the spout passes between the lateral attachment walls, and each lateral wall contacts an exterior surface of the spout; and
   wherein the flexible container includes an interior surface and an exterior surface, the interior surface for contacting the elevated ridges when the spout fitment is attached to the flexible container.

15. The spout fitment of claim 14, wherein each end of the base portion includes at least one pocket in communication with the spout, the pocket defined by a juncture of the spout, the bottom wall, and the lateral attachment walls.

16. The spout fitment of claim 15, the base portion having tapering end portions, the tapering end portions defining a portion of the pocket.

17. The spout fitment of claim 15, wherein at least one lateral attachment wall comprises a plurality of non-intersecting elevated ridges.

18. The spout fitment of claim 17, wherein the elevated ridges define zigzagging pathways.

\* \* \* \* \*